Dec. 30, 1969  LEROY F. KLINE ET AL  3,486,312
AIR CLEANER
Filed Dec. 4, 1967

LEROY F. KLINE
RALPH E. SENDELBACH
INVENTORS

BY John R. Faulkner
Robert E. McCallum

ATTORNEYS

United States Patent Office 3,486,312
Patented Dec. 30, 1969

3,486,312
AIR CLEANER
Leroy F. Kline, Dearborn, and Ralph E. Sendelbach, Birmingham, Mich., assignors to Ford Motor Company, Dearborn, Mich., a corporation of Delaware
Filed Dec. 4, 1967, Ser. No. 687,632
Int. Cl. B01d 46/02
U.S. Cl. 55—363                 6 Claims

ABSTRACT OF THE DISCLOSURE

An air cleaner for use with a downdraft type carburetor having a removable toroidal-shaped filter bag with a 360°, annular air intake opening.

BACKGROUND OF THE INVENTION

The removal of dirt particles from the intake air on an internal combustion engine has been found to be necessary for continued, reliable operation of the engine. A common type of air cleaner which performs this function consists of a generally cylindrically shaped container having an air inlet and an air outlet separated by an annular filter element. The filter element often consists of a pleated filter membrane sealed between two end pieces and placed in the container so as to separate the inlet from the outlet. The filter element is held in place by the container and may be removed and replaced when servicing is required.

This invention substitutes for the relatively expensive pleated membrane filter element an economical and novel toroidal-shaped bag having a 360° annular air intake opening. The invention thus provides an efficient, disposable filter membrane for an engine air cleaner which has a lower initial cost and a lower replacement cost than conventional pleated type filter elements.

BRIEF SUMMARY OF THE INVENTION

An air cleaner constructed in accordance with this invention includes an annular housing having upper and lower portions forming an enclosure. The upper portion is spaced apart from the lower portion to form a peripheral annular air inlet opening in the housing. A doughnut- or toroidal-shaped removable filter bag is received in the enclosure and is secured to the housing adjacent the peripheral annular opening. Thus secured, the filter bag has an annular air inlet opening corresponding to the housing opening. An air outlet port is located in one of the portions of the housing and is partitioned from the housing opening by the filter bag. Air enters the air cleaner through the housing opening and the filter bag opening, is cleaned of suspended particles as it passes through the filter bag, and is discharged from the air cleaner through the outlet port.

DETAILED DESCRIPTION OF THE INVENTION

Figure 1:
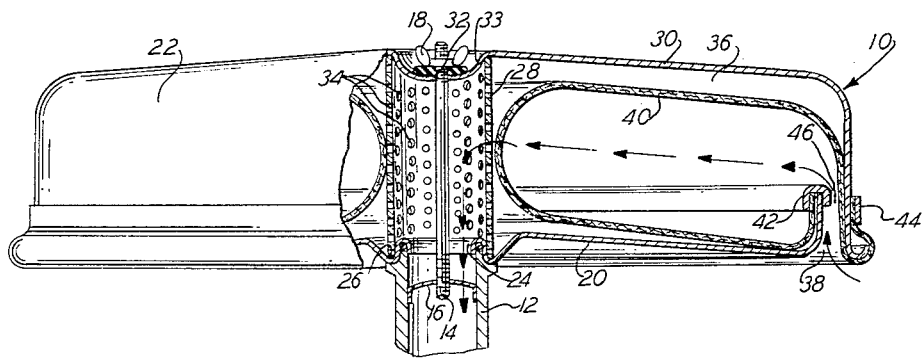
FIGURE 1 is an elevational view with a section broken away of an air cleaner which incorporates a preferred embodiment of the invention.
Figure 2:
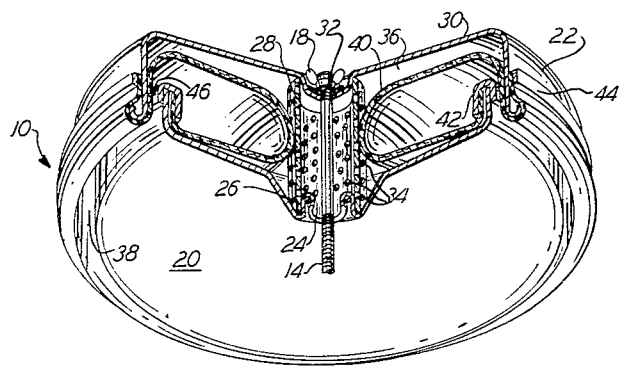
FIGURE 2 is a perspective view with a section broken away from the underside of an air cleaner which incorporates a preferred embodiment of the invention.

Referring now to the drawings, an air cleaner embodiment 10 of the present invention is intended for mounting on a downdraft carburetor, a portion of which is designated by reference numeral 12. A stud 14 threadedly engages a bracket 16 in the air inlet to the carburetor and extends vertically through the air cleaner 10. A wing nut 18 threadedly engages the stud 14 to secure the air cleaner in place over the carburetor.

The air cleaner 10 comprises a lower tray portion 20 and an upper cover portion 22 which may be formed of either sheet metal or a suitable plastic. The tray portion 20 is circular in shape and has a centrally located air outlet port 24. Adjacent the air outlet port 24 and concentric therewith is an annular depression 26 which receives and locates one end of a cylindrical screen 28.

The cover portion 22 is substantially cylindrical in shape and has a closed upper end 30. A hole 32 is located in the center of cover portion 22 through which stud 14 extends. A circular indentation 33 concentric with hole 32 is formed in the cover portion which protrudes into the upper end of cylindrical screen 28.

The cylindrical screen 28 is formed of a rigid material and has numerous perforations or holes 34 to permit free passage of air therethrough. The screen 28 vertically and radially locates the cover portion 22 relative to the tray portion 20. Thus located, the cover portion and the tray portion form an enclosure 36. The tray portion 20 has a lesser outer diameter than the cover portion 22 thereby forming an annular opening 38 into the enclosure 36.

The filter element consists of a toroidal- or doughnut-shaped bag 40 received within the enclosure 36. The bag has two continuous edge portions, one of which is secured to the tray portion adjacent the opening 38 by an elastic grommet 42 and the other of which is secured to the cover portion adjacent opening 38 by an elastic band 44. An annular opening 46, corresponding to annular opening 38 of the housing, is thus formed in filter bag 40. The cylindrical screen 28 prevents the bag from over-inflating and blocking the outlet port 24. The bag is made of a fibrous filter material which permits the passage of air but retains the dirt particles carried in the air.

In operation, ambient air enters the air cleaner 10 through openings 38 and 46, passes through the air permeable membrane of filter bag 40, and is discharged from the air cleaner into the carburetor through port 24. To remove the filter bag when it becomes full, the elastic band 44 is first removed, wing nut 18 is unscrewed and the cover portion 22 lifted away. With the final removal of grommet 42, the entire filter bag 40 may be lifted out and disposed and a new filter bag replaced.

The foregoing description presents the presently preferred embodiment of the invention. Modifications and alterations will occur to those skilled in the art that are included within the scope and spirit of the invention.

What is claimed is:

1. In an internal combustion engine having a carburetor, an air cleaner assembly comprising:
   a supporting tray having a central port formed therein constructed to receive the air inlet portion of said carburetor,
   a cylindrical screen having one end engaging said tray and positioned around said port, said screen extending axially from said tray and the inlet portion of said carburetor,
   a cover positioned on the other end of said cylindrical screen,
   said tray and said cover forming an enclosure,
   first fastening means to secure said cover, said screen and said tray to said carburetor,
   the outer peripheral portion of said tray comprising an annular upturned portion,
   the outer peripheral portion of said cover comprising an annular downturned portion surrounding said upturned portion,
   said downturned portion being concentric with and radially spaced from said upturned portion to provide an annular air inlet opening to said enclosure,
   a generally toroidal-shaped filter bag received within said housing, said filter bag having a pair of circular outer peripheral edges, second fastening means securing said filter bag adjacent one of said circular edges to said upturned portion, third fastening means securing said filter bag adjacent the other of said circular edges to said downturned portion.

2. An air cleaner assembly according to claim 1 and including:

said cover having centrally located indentation extending into said enclosure, said tray having a flange positioned around said port and extending into said enclosure, said screen receiving said indentation at one axial end and said flange at the other axial end thereby radially and axially positioning said cover relative to said tray.

3. An air cleaner assembly according to claim 1 wherein said second and third fastening means comprises an annular-shaped elastic means.

4. An air cleaner assembly according to claim 1 and including:

one of said second and third fastening means comprising an annular means comprising an annular clip having a U-shaped cross section frictionally receiving one of said outer peripheral portions of said tray and cover.

5. An air cleaner assembly comprising:

a supporting tray having a central outlet port formed therein, support means having a portion engaging said tray, a cover engaging another portion of said support means, said tray and said cover forming an enclosure, first fastening means to secure said cover, said support means and said tray together, the outer peripheral portion of said tray comprising an annular upturned portion extending toward said cover, the outer peripheral portion of said cover comprising an annular downturned portion extending toward said tray, said downturned portion being concentric with and radially spaced from said upturned portion to provide an annular air inlet opening to said enclosure, a generally toroidal-shaped inflatable filter bag received within said housing, said filter bag having a pair of spaced circular outer peripheral edges defining an annular mouth into said filter bag, second fastening means securing one of said edges of said filter bag to said upturned portion, third fastening means securing the outer of said edges of said filter bag to said downturned portion, said filter bag extending radially inwardly from said annular air inlet opening.

6. An air cleaner assembly according to claim 5 wherein said second and third fastening means comprise annular-shaped elastic means.

References Cited

UNITED STATES PATENTS

| | | | |
|---|---|---|---|
| 1,086,591 | 2/1914 | Fulton | 55—363 |
| 2,799,357 | 7/1957 | Warnecke et al. | 55—529 |
| 1,573,771 | 2/1926 | McClatchie | 55—363 |
| 2,116,233 | 5/1938 | Cole | 55—377 |
| 2,905,267 | 9/1959 | Thompson | 55—363 |
| 2,994,435 | 8/1961 | Moore | 210—484 |
| 3,107,987 | 10/1963 | Duer | 55—521 |
| 3,226,917 | 1/1966 | Donovan et al. | 55—502 |
| 3,385,038 | 5/1968 | Davis | 210—493 |

FOREIGN PATENTS 40,908   5/1914   Sweden.

HARRY B. THORNTON, Primary Examiner

B. NOZICK, Assistant Examiner

U.S. Cl. X.R.

55—378, 510, 529